UNITED STATES PATENT OFFICE.

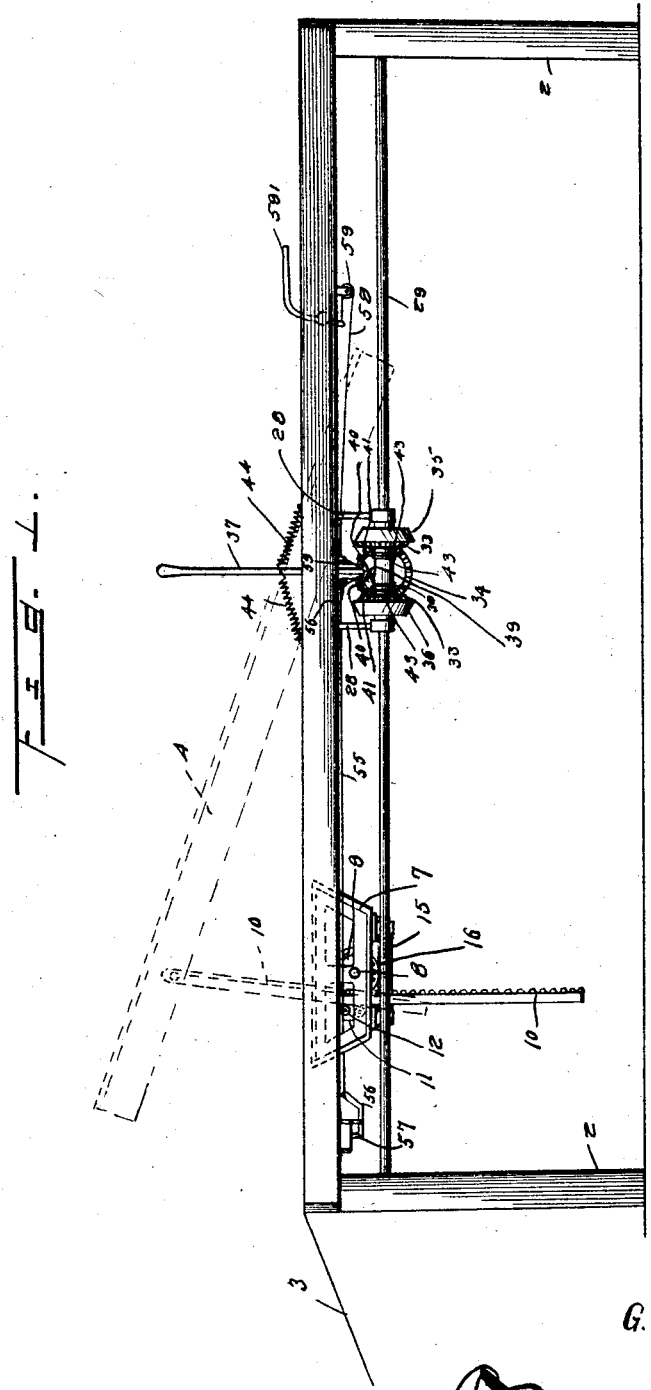

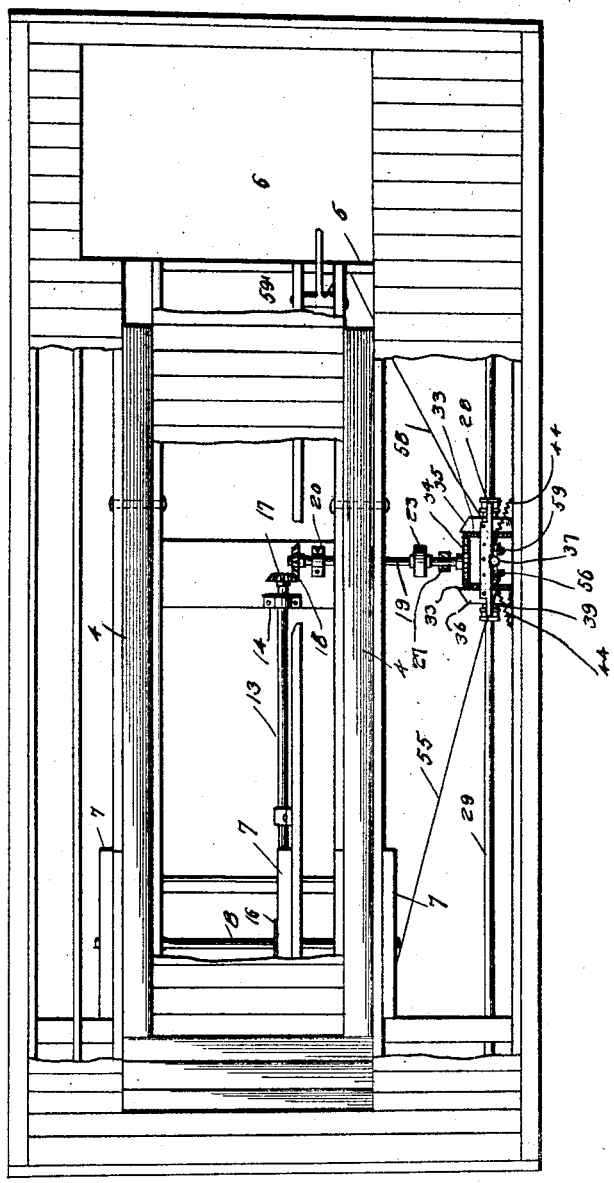

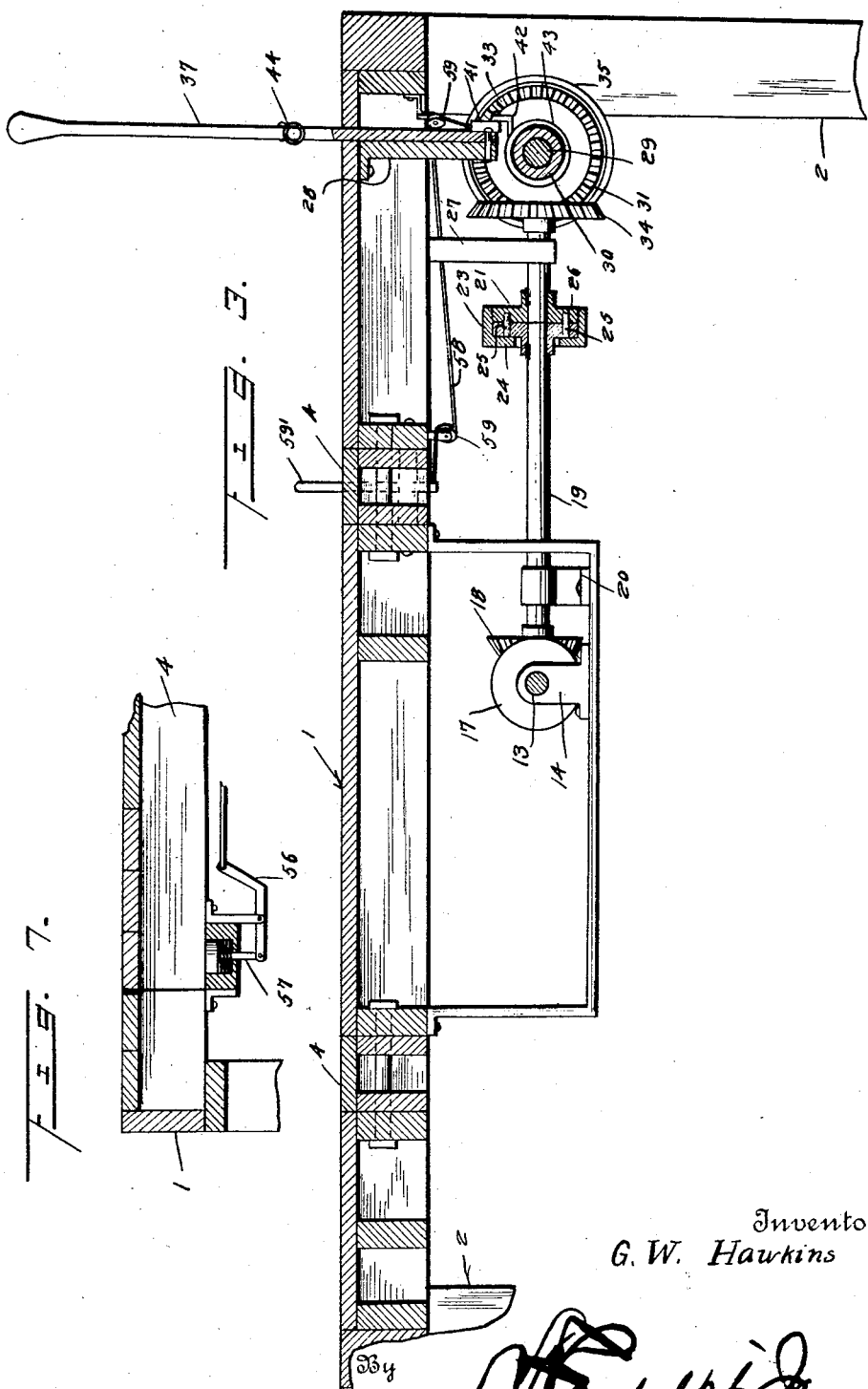

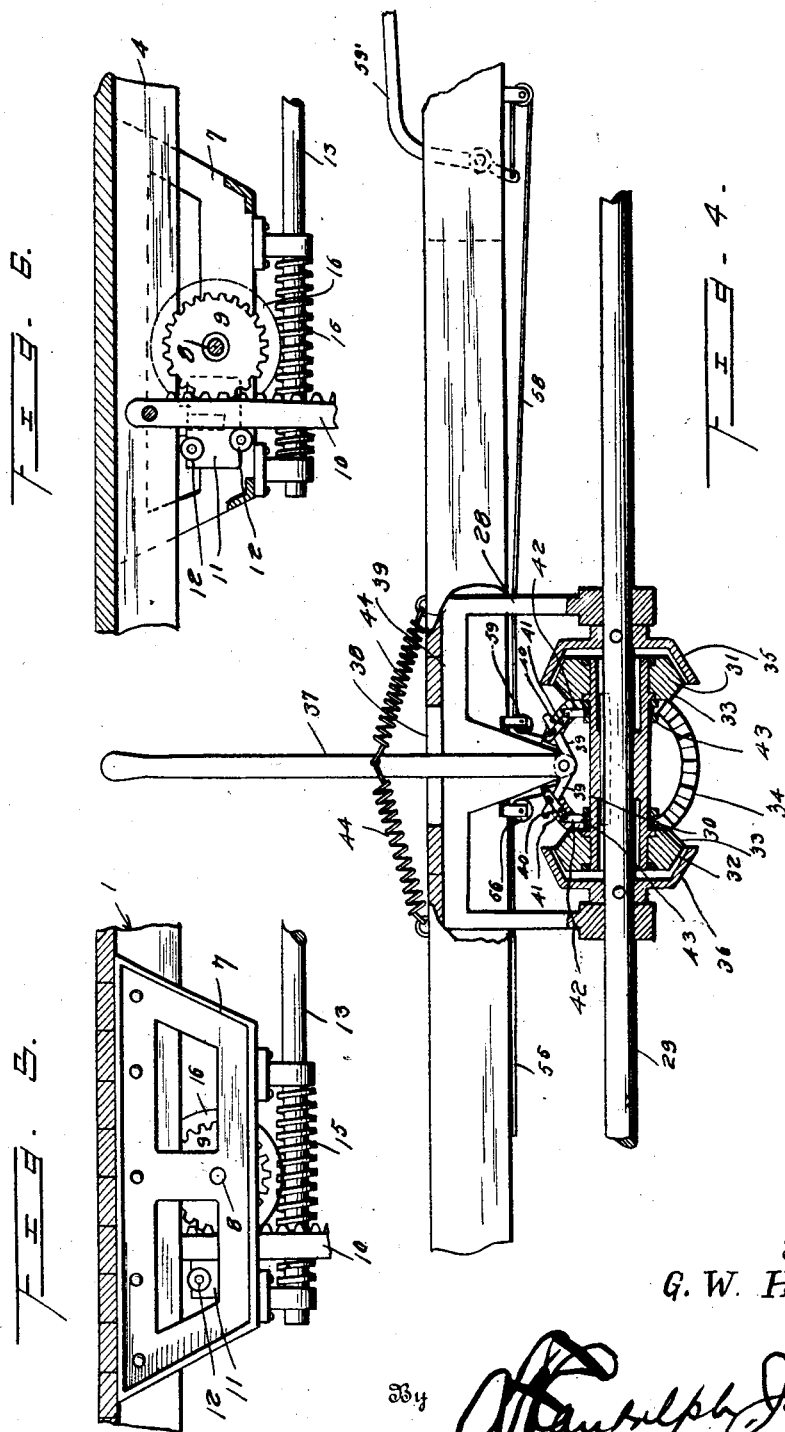

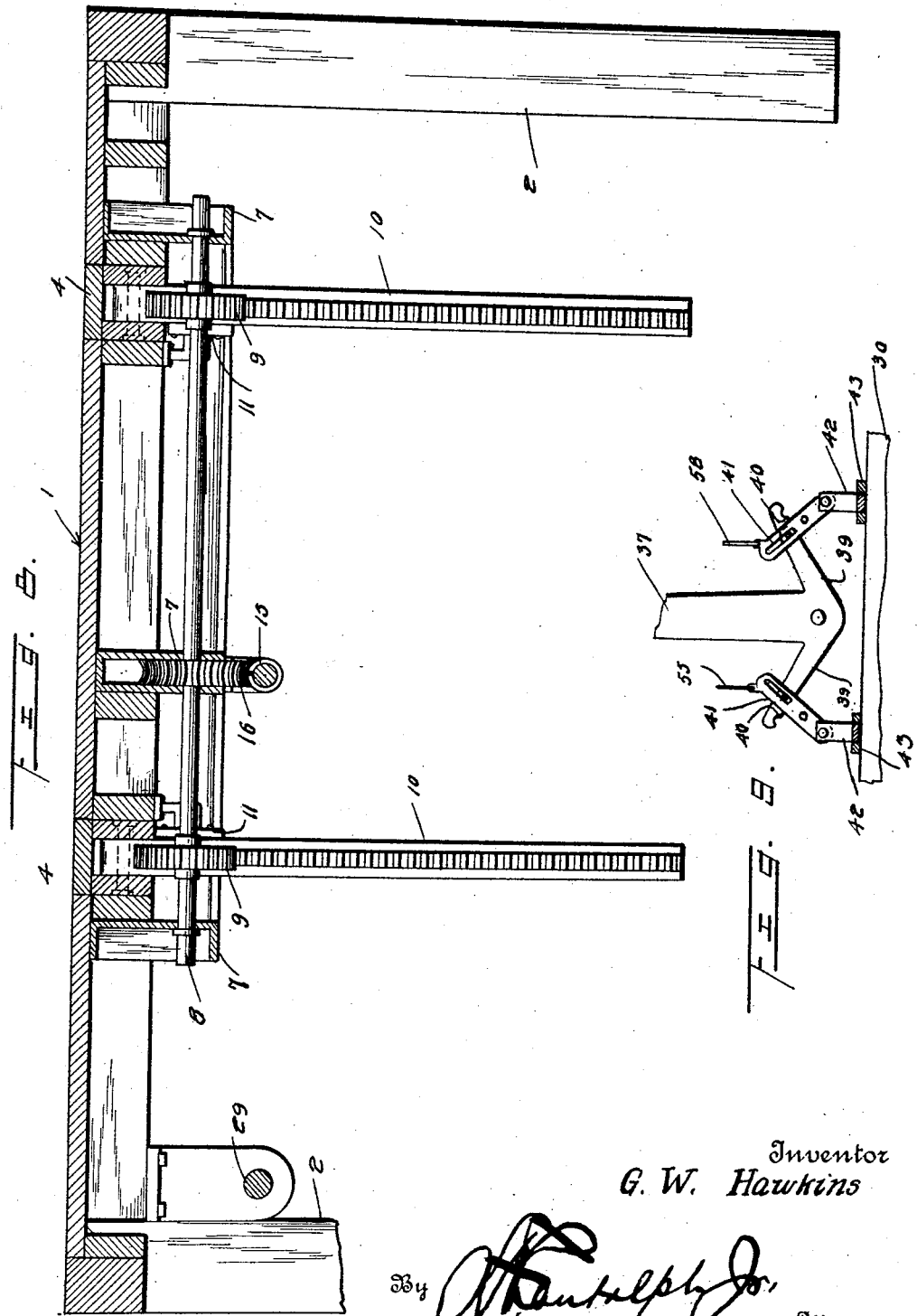

GEORGE W. HAWKINS, OF KEITHSBURG, ILLINOIS.

AUTOMATIC TRUCK DUMP.

1,409,853.   Specification of Letters Patent.   Patented Mar. 14, 1922.

Application filed October 6, 1920. Serial No. 414,958.

*To all whom it may concern:*

Be it known that I, GEORGE W. HAWKINS, a citizen of the United States, residing at Keithsburg, in the county of Mercer and State of Illinois, have invented certain new and useful Improvements in Automatic Truck Dumps; and I do hereby declare the following to be a full, clear, and exact description of the invention, such as will enable others skilled in the art to which it appertains to make and use the same.

This invention relates to new and useful improvements in truck dumps and has for its primary object the provision of means whereby a truck or vehicle may be bodily inclined so that its contents may slide therefrom, thus obviate the necessity of manually unloading the vehicle and also permit quick unloading of vehicles not equipped with dumping bodies.

Another object of this invention is the provision of a pivoted table for supporting the vehicle and which is so equipped with a power means that the same may be easily and quickly moved into or out of dumping position.

A further object of this invention is the provision of means for automatically disconnecting the power source from the table when the latter reaches either a dumping or non-dumping position.

A still further object of this invention is the provision of a truck dump of the above stated character which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a side elevation, illustrating a truck dump constructed in accordance with my invention, Figure 2 is a top plan view partly broken away illustrating the same, Figure 3 is a sectional view, illustrating means for rendering the device inoperative in case of excessive strain, Figure 4 is an enlarged detail sectional view, illustrating the means for controlling the movement of the table, Figure 5 is a detail sectional view illustrating a worm connection between a pair of shafts and the hangers for said shafts, Figure 6 is a detail sectional view illustrating means for imparting a raising and lowering motion to the table from a rotating shaft, Figure 7 is a fragmentary sectional view illustrating a trip for automatically disconnecting the power source from the table when the same reaches a non-dumping position, Figure 8 is a transverse sectional view illustrating the rack bars and gears for raising and lowering the table, Figure 9 is a detail view partly in section, illustrating the controlling lever and the locking means therefor.

Referring in detail to the drawings, the numeral 1 indicates as an entirety a platform adapted to have one end arranged over a pit or the like to receive the contents of vehicles and which end may also be associated with an elevator if so desired, for taking away the contents after the same is deposited in the pit. The platform is supported in any desired manner in spaced relation to the ground and in this instance legs 2 are shown for such a purpose and the other end of the platform has an inclined roadway 3 so that a vehicle may be readily run onto and off the platform. The platform has pivotally connected thereto a table 4. The pivotal connection between the table 4 and platform is closer to one end of the table than the other end and one end of the table terminates adjacent an abutting beam 5 that extends along one edge of the pit 6. The abutting beam 5 is adapted to be engaged by the rear wheels of the vehicle when the table 4 is disposed on an inclined plane to prevent the vehicle from rolling into the pit 6.

Hangers 7 are secured to the platform 1 and depend below the same and have journaled therein a transversely extending shaft 8 to which are secured pinions 9 that mesh with rack bars 10. The rack bars 10 are slidably mounted in suitable guides 11 and have their upper ends pivotally connected to the forward end of the table 4, so that upon rotation of the shaft 8 in one direction, the table will be elevated to a position as illustrated in dotted lines in Figure 1 and when in this position, the contents in the truck may then slide freely down into the pit 6. The guides 11 are carried by the hangers 7 and are provided with anti-friction rollers 12 that engage the rack bars 10 to permit said rack bars to slide freely within the guides 11.

A longitudinally extending shaft 13 is journaled in suitable bearings 14 carried by the platform and said shaft 13 is disposed under the platform and underlies the transverse shaft 8 and is provided with a worm 15 which meshes with a worm wheel 16 secured to the transverse shaft 8 and the other end of the shaft 13 is provided with a bevel gear 17 that meshes with a bevel gear 18 secured to a transversely extending shaft 19. The shaft 19 is journaled in suitable bearings 20 carried by the platform and consists of a pair of sections. The abutting ends of the sections of the shaft 19 has splined or otherwise secured thereto disks 21 and 22 which have abutting engagement with each other and the periphery of the disk 21 is screw threaded to receive an annular member 23 which is provided with an inwardly directed annular flange 24 that overlies the disk 22, so as to retain the disks in engagement with each other. The disk 22 is provided with openings to receive fragile pins 25 that enter sockets 26 formed in the plate 21, thereby establishing a coupling between the sections of the shaft 19 which will under ordinary operating conditions cause the two sections to rotate in unison, but if any of the working parts of the device receive an excessive strain, the fragile pins 25 are sheared rendering the device inoperative. The other end of the shaft 19 is journaled in a suitable support 27 which depends downwardly from the platform 1 and is supported by the same. A hanger 28 is secured to the platform and rotatably supports a power shaft 29 that has its ends journaled to the platform and said shaft may be rotated by any suitable power source (not shown). A sleeve 30 is rotatably and slidably mounted on the power shaft 29 and has secured to its ends male clutch elements 31 and 32, the opposing faces of which have formed thereon teeth 33 that are adapted to mesh with a beveled gear 34 secured to the outer end of the shaft 19. Female clutch elements 35 and 36 are secured to the power shaft 29 and are alternately engaged by the male clutch elements 31 and 32 respectively.

A controlling lever 37 is pivoted to the lower end of an extension formed on the hanger 28 and extends upwardly through the platform 1 by way of a slot 38 and has formed on its pivoted end arms 39 which have notches 40 in their free ends. Links 41 are connected to the arms inwardly of their ends by pin and slot connections and said links are in turn pivoted to forks 42 that engage the sleeve 30 between spaced flanges 43. The lever 37 is normally maintained in a vertical position by springs 44 and when in said position the clutch elements 31 and 32 are disengaged from the clutch elements 35 and 36 respectively and the links and arms are disposed angularly to each other as clearly shown in Figure 4. The links are provided with pins adapted to be received by the notches of the arms when the lever 37 is swung in either direction to alternately engage the male clutch elements 31 and 32 with the female clutch elements 35 and 36 so as to hold the lever in either of its active positions. By having the pairs of clutch elements, the table may be elevated and lowered by the power shaft 29. The clutch elements 31 and 32 or the teeth 33 thereof are continuously in mesh with the gear 34 and the movement of said clutch elements is very slight and only sufficient to bring their respective clutch faces out of engagement with the female clutch elements 35 and 36. When the controlling lever 37 is swung on its pivot from a neutral position into one of its active positions, one of the arms and one of the links move into substantially parallelism so as to dispose the pin within the notch of the arm which will retain the lever in its active position until manually actuated.

One of the links 40 has connected thereto a cable 55 which passes over a series of pulleys and is connected to a bell crank lever 56 pivoted to the platform. The bell crank lever is connected to a spring actuated plunger 57 which extends up through the platform and is adapted to be engaged by the table when in a substantially horizontal position for the purpose of elevating said link and permitting the controlling lever to return to its normal position to stop the operation of the driving mechanism on the platform.

The other link has connected thereto a cable 58 which passes over pulleys 59 carried by the platform 1 and is connected to one end of a trip lever 59' and the latter is pivotally mounted in the platform and has a comparatively long inclined end 60 which is disposed over the table adjacent its rear or shortest end and is adapted to be engaged by the differential housing of a vehicle when said table reaches substantially its fullest inclined position, thereby elevating the last named link so as to break the lock to the controlling lever 37 and to return to its neutral position under the influence of the spring and thereby stop the operation of the driving action on the table.

In operation, when a truck has been properly positioned on a table, the controlling lever 37 is manually pushed in one direction and remains in this position by the lock arrangement. When the lever is in said position, the power shaft is so connected with the shaft 19 that the shaft 19 will be rotated in the proper direction to elevate or swing the table into an inclined position thereby bodily swinging or moving the truck into an inclined position so that the contents thereof may readily slide into the pit. When the table reaches its substantially fullest inclined position, the differential housing of the truck engages the trip lever 59' depressing the same, exerting a pull on the cable 58 which breaks the locking connection to the controlling lever, and said controlling lever returns to its initial or neutral position by the springs 44 and thereby disconnects the heretofore engaged clutch elements and stops the driving action on the table.

After the truck has been emptied of its contents, the controlling lever 37 is swung in an opposite direction bringing the proper clutch elements in engagement with each other to bring about the proper driving action to move the table into a substantially horizontal position and when the latter reaches a substantially horizontal position, it depresses the spring plunger 57 which rocks the bell crank lever 56 and exerts a pull on the cable 55 elevating the respective link to break the lock for the lever 37 and permit the latter to swing to its neutral position under the influence of the springs 44.

While I have shown and described the preferred embodiment of my invention, it will be understood that minor changes in construction, combination, and arrangement of parts may be made without departing from the spirit and scope of the invention as claimed.

Having thus described my invention what I claim is:

1. A truck dump comprising a platform, a table pivoted to said platform, a power shaft, a pair of clutches associated with the power shaft, means establishing a permanent driving connection between the clutches and the table, a controlling lever pivotally mounted and connected to the clutches for alternately actuating the clutches to raise and lower the table, means normally returning and holding the controlling table in a neutral position, and means for locking the controlling lever in either of its operative or active positions.

2. A truck dump comprising a platform, a table pivoted to said platform, a power shaft, a pair of clutches associated with the power shaft, a transverse shaft journaled to the platform, means connected to the table and to the transverse shaft for raising and lowering the table according to the rotation of said shaft, means establishing a permanent driving connection between the clutches of said transverse shaft, a controlling lever pivotally mounted to the platform and connected with the clutches for alternately actuating the clutches to establish a reversible drive connection between the power shaft and the transverse shaft, means normally holding the controlling lever in position, means locking the controlling lever in either of its operative positions, and automatic means for releasing the lever from either of its latter named positions when the table reaches either its lowered or elevated position.

3. A truck dump comprising a platform, a table pivoted to said platform, a power shaft, a transverse shaft journaled on the platform, gears secured to the shaft, rack bars pivoted to the table and in mesh with the gears, clutches associated with the power shaft, means establishing a driving connection between the transverse shaft and the clutches, a controlling lever connected to said clutches and pivotally mounted, means normally holding the controlling lever in a neutral position, means locking the controlling lever in either of its operative positions, and means adapted to release the locking means so as to permit the controlling lever to return to a neutral position when the table reaches either its elevated or lowered position.

4. A truck dump comprising a platform, a table pivoted to said platform, a power shaft, clutches associated with said power shaft, a driving connection between said clutches and the table, a controlling lever pivoted to the platform and connected to the clutches for alternately operating the clutches, tension means normally holding the controlling lever in a neutral position, locking means for the controlling lever in either of its operative positions, trips connected with the locking means and adapted to be actuated by the platform when reaching its lowermost position and by part of the vehicle carried by the table when said platform reaches an elevated position.

5. A truck dump comprising a platform a table pivoted to said platform, a power shaft, clutches associated with said power shaft, means connecting the clutches with the table, a controlling lever pivotally mounted on the platform, arms formed on the pivoted end of said lever and having notches in their ends, links connected to said arms by pin and slot connections, means connecting the links to the clutch elements pins carried by said links and adapted to engage the notches when the lever is in either of its operative positions to lock said lever in said positions, and means connected to said links for disengaging the pins from the notches to free the lever from its locked position, and means for returning the lever to its neutral position.

6. A truck dump including a pivoted table, means for raising and lowering the table, an element controlling said means and adapted to be moved from a neutral position into a position to cause said means to raise the table and from said neutral position into a position to cause said means to lower the table, means normally holding said element in neutral position, retractable means adapted to hold said element in either of its operative positions, and table and vehicle control means adapted to retract said element holding means when the table reaches either its elevated or lowered position.

In testimony whereof I affix my signature in presence of two witnesses.

GEORGE W. HAWKINS.

Witnesses:
ELMER E. SMITH,
C. A. HOYT.